US010369657B2

(12) United States Patent
Sato

(10) Patent No.: US 10,369,657 B2
(45) Date of Patent: Aug. 6, 2019

(54) JOINING RESONATOR OR JOINING SUPPORT JIG

(71) Applicant: ULTEX CORPORATION, Fukuoka-shi, Fukuoka (JP)

(72) Inventor: Shigeru Sato, Fukuoka (JP)

(73) Assignee: ULTEX CORPORATION, Fukuoka (JP)

( * ) Notice: Subject to any disclaimer, the term of this patent is extended or adjusted under 35 U.S.C. 154(b) by 0 days.

(21) Appl. No.: 15/714,312

(22) Filed: Sep. 25, 2017

(65) Prior Publication Data

US 2018/0085847 A1      Mar. 29, 2018

(30) Foreign Application Priority Data

Sep. 26, 2016   (JP) .................................. 2016-186358
Sep. 21, 2017   (JP) .................................. 2017-181849

(51) Int. Cl.
*B23K 20/00*       (2006.01)
*B23K 20/10*       (2006.01)

(52) U.S. Cl.
CPC ............ *B23K 20/10* (2013.01); *B23K 20/106* (2013.01)

(58) Field of Classification Search
CPC .............................. B23K 20/106; B23K 20/10
USPC ............................................. 228/110.1, 1.1
See application file for complete search history.

(56) References Cited

U.S. PATENT DOCUMENTS

| 8,651,163 | B1 * | 2/2014 | Widhalm | B23K 20/106 |
| | | | | 156/580.2 |
| 2006/0065697 | A1 * | 3/2006 | Kobae | B23K 20/10 |
| | | | | 228/110.1 |
| 2016/0052081 | A1 * | 2/2016 | Regenberg | B23K 20/106 |
| | | | | 228/110.1 |

FOREIGN PATENT DOCUMENTS

| WO | 2014/024802 A1 | 2/2014 | |
| WO | WO-2014161823 A1 * | 10/2014 | ........... B23K 20/106 |

OTHER PUBLICATIONS

"The Innovation Supplier for Plastic and Metal Assembly", Cosmo System, 3 page, Sep. 2016.

* cited by examiner

*Primary Examiner* — Erin B Saad
(74) *Attorney, Agent, or Firm* — Sughrue Mion, PLLC; Richard C. Turner

(57) ABSTRACT

A distal end portion for pressing an object to be joined of one of a resonator and a reception jig is constituted as a protrusion having an outer face not including an angular sharp edge, such as a hog-backed shape or a semispherical shape, and during joining, while metal foils stacked are being laterally thinly stretched with lateral vibration from the resonator and atoms of the metal foils are being moved laterally without the protrusions forcibly holding down the metal foils, a metal amount corresponding to a volume stretched is smoothly discharged along a curved face without breaking the metal foils, and even when the stacked metal foils are used as the object to be joined, breaking of the metal foils is not generated during joining, so that a step of protecting the metal foils with a protection member is unnecessary.

6 Claims, 18 Drawing Sheets

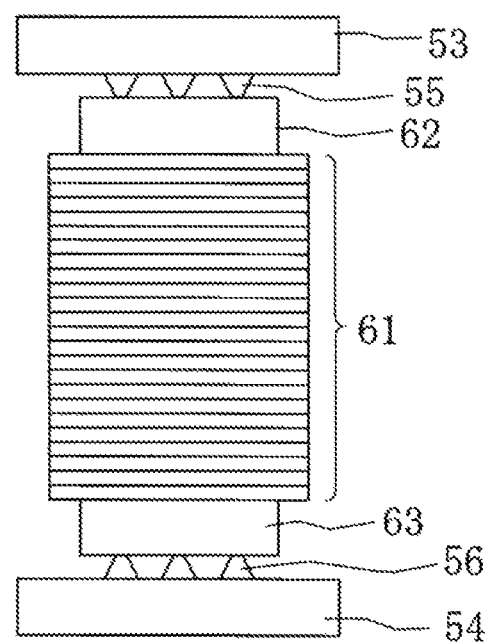
Fig. 23 [Prior Art]

JOINING RESONATOR OR JOINING SUPPORT JIG

BACKGROUND OF INVENTION

1. Field of Invention

The present invention relates to a resonator for joining and a reception jig for joining where a shape of a distal end portion of the resonator for joining for pressing down an object to be joined or a shape of a distal end portion of the reception jig for joining for pressing down an object to be joined is devised so that joining of metal foils can be performed by ultrasonic vibration or acoustic vibration at least without protection member protecting the metal foils from the distal end portions.

2. Description of the Related Art

With reference to FIGS. 21 and 22, metal joining disclosed in Non-Patent Literature 1 (Principle of Ultrasonic Metal Joining (Technical Description), COSMO SYSTEM CO. LTD. [searched on Sep. 7, 2016: Internet: <URL:http://www.cosmo-stm.com/usmetal/about-us-metal-welding.html>]) will be described. In metal joining shown in FIG. 21, lateral ultrasonic vibration is applied to an object to be joined 52 composed of a plurality of metal members 51 stacked on one another by a resonator 53 while pressure is applied thereto by the resonator 53 and an anvil 54, so that friction occurs at an interface between the plurality of metal members 51 stacked together, motions of metal atoms are activated from heating due to frictional heat, migration of the metal atoms due to diffusion occurs, the metal atoms is bonded together by attraction force generated between the metal atoms, which results in joining of the plurality of metal members 51 stacked. A distal end portion 55 of the resonator 53 for pressing down the metal members 51 and a distal end portion 56 of the anvil 54 for pressing down the metal members 51 are constituted as pyramidal or truncated pyramidal protrusions gradually thinning in a direction of protruding from the side of the resonator 53 or the anvil 54, as shown in FIG. 22, and they grips the object to be joined 52 shown in FIG. 21.

In recent years, a lithium ion cell or the like has such a tendency that each of metal foils is made thinner and the number of metal foils to be joined is increased. When the thickness of the metal foil is made thinner and the number of metal foils to be joined is increased, such an event can occur that, as the distal end portions 55 and 56 composed of the pyramidal or truncated pyramidal protrusions are piercing the metal foils during joining, edges of adjacent faces crossing at each other of the distal end portions 55 and 56 are sharpened, which results in breaking of a metal foil(s) of the metal foils.

In order to prevent breaking of the metal foil(s) due to the distal end portions 55 and 56 composed of the pyramidal or truncated pyramidal protrusions, utilization of the invention for joining metal foils by ultrasonic vibration disclosed in paragraph [0027] to paragraph [0030] and FIG. 5 in Patent Literature 1 (WO2014/24802) is considered.

With reference to FIG. 23, a case where a plurality of metal foils 61 are joined to one another by ultrasonic vibration by utilizing the invention disclosed in paragraph [0027] to paragraph [0030] and FIG. 5 in Patent Literature 1 will be described. As shown in FIG. 23, the plurality of metal foils 61 stacked are sandwiched by protection members 62 and 63 made of a metal sheet from above and below, protection members 62 and 63 are sandwiched by the distal end portion 55 of the resonator 53 and the distal end portion 56 of the anvil 54 from above and below, pressure and ultrasonic vibration are applied to the metal foils 61 and the protection members 62 and 63 by the resonator 53 so that the metal foils 61 and the protection members 62 and 63 are joined to one another by ultrasonic vibration without the distal end portions 55 and 56 breaking the protection members 62 and 63 and the metal foils 61.

However, since a step of protecting the plurality of metal foils 61 stacked with the protection members 62 and 63 is added, the metal joining shown in FIG. 23 cannot be adopted as it is.

PRIOR LITERATURE

Patent Literature

[Patent Literature 1] WO2014/24802

Non-Patent Literature

[Non-Patent Literature 1] Principle of Ultrasonic Metal Joining (Technical Description), COSMO SYSTEM CO. LTD. [searched on Sep. 7, 2016; Internet; <URL:http://www.cosmo-stm.com/usmetal/about-us-metal-welding.html>]

SUMMARY OF INVENTION

The present invention has been made in view of the above-mentioned background art, and an object thereof is to provide a resonator for joining and a reception jig for joining where a shape of a distal end portion of the resonator for joining for pressing down an object to be joined or a shape of a distal end portion of the reception jig for joining for pressing down an object to be joined is devised so that joining of metal foils can be performed by ultrasonic vibration or acoustic vibration at least without a protection member protecting the metal foils from the distal end portion.

The present invention is directed to a resonator for joining and a reception jig for joining which are used when an object to be joined is joined by utilizing ultrasonic vibration or acoustic vibration, wherein a distal end portion of the resonator for joining for pressing down the object to be joined or a distal end portion of the reception jig for joining for pressing down the object to be joined is constituted as a protrusion having an outer face which does not include an angular sharp edge.

In the present invention, since the distal end portion of the resonator for joining for pressing down the object to be joined or the distal end portion of the reception jig for joining for pressing down the object to be joined is constituted as the protrusion having the outer face which does not include an angular sharp edge, such an effect can be achieved that, even when a plurality of metal foils stacked are used as the object to be joined, the distal end portion does not break the metal foil(s) during joining so that the plurality of metal foils stacked can be joined to one another by ultrasonic vibration or acoustic vibration without a protection member protecting the metal foils from the distal end portion. In addition, in the present invention, when a root portion of the protrusion on the resonator side is formed in a concave arc-shaped face portion recessed from the outside of the resonator toward inside of the resonator, a crack is prevented from being generated at the root portion of the protrusion and the finish of the joining can show a beautiful appearance in which the concave arc-shaped face portion of the root portion has been reflected.

BRIEF DESCRIPTION OF DRAWINGS

FIG. 21 is a schematic diagram showing metal joining disclosed in Non-Patent Literature 1;

FIG. 22 is a perspective view showing truncated pyramidal protrusions serving as distal end portions of a conventional resonator or a conventional anvil for pressing down an object to be joined; and FIG. 23 is a schematic diagram showing metal joining utilizing the invention disclosed in Patent Literature 1.

DETAILED DESCRIPTION OF INVENTION

Figure 1:
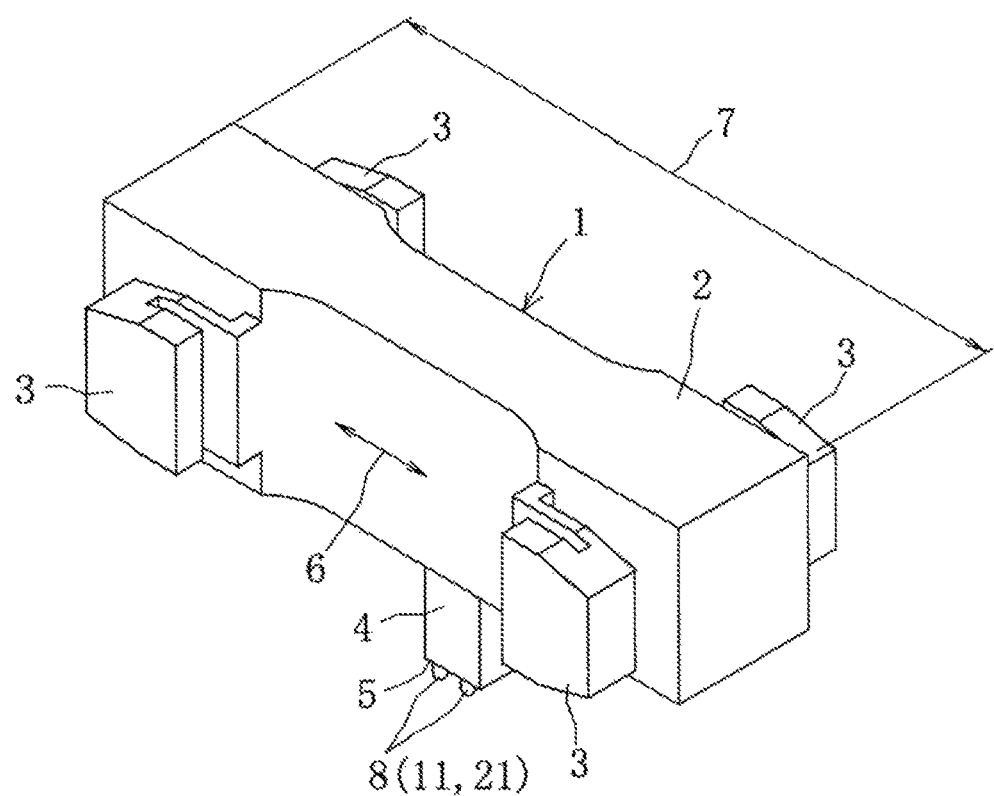
FIG. 1 is a perspective view showing a resonator for joining according to an embodiment for carrying out the present invention.

With reference to FIG. 1, a structure of a resonator for joining 1 according to an embodiment for carrying out invention will be described. The resonator for joining 1 is hereinafter expressed as a resonator 1. The resonator 1 shown in FIG. 1 is one for joining an object to be joined by utilizing ultrasonic vibration or acoustic vibration, and a distal end portion 8 of the resonator 1 for pressing down the object to be joined is constituted as a semispherical protrusion 11, shown in FIGS. 2A to 2C, having an outer face which does not include an angular sharp edge, a hog-backed protrusion 21, shown in FIGS. 8A to 8C, having an outer face which does not include an angular shape edge, or a mixture of the semispherical protrusion 11 shown in FIGS. 2A to 2C and the hog-backed protrusion 21 shown in FIGS. 8A to 8C, so that when a plurality of metal foils stacked are used as the object to be joined, the metal foil(s) is not broken by the distal end portion 8 during the joining, which results in unnecessity of a step of protecting the plurality of stacked metal foils with a protection member. The number of the distal end portions 8 may be one or plural. When the number of distal end portions 8 is plural, each of the distal end portions 8 may have a different size or the same size.

The resonator 1 is made from aluminum alloy, titanium alloy, iron alloy or the like according to the purpose of joining, and is provided with a resonation main body portion 2, a supporting portion 3, and a joining tool portion 4. A workpiece-side face 5 of the joining tool portion 4 is a face toward to the object to be joined during the joining, and constitutes a transverse plane perpendicular to a center line extending in a vertical direction of the joining tool portion 4. On the workpiece-side face 5, the distal end portion 8 is provided as the semispherical protrusion 11 shown in FIGS. 2A to 2C, the hog-backed protrusion 21 shown in FIGS. 8A to 8C, or a mixture of the semispherical protrusion 11 shown in FIGS. 2A to 2C and the hog-backed protrusion 21 shown in FIGS. 8A to 8C. The object to be joined is synonymous with an object to be joined 41 shown in FIG. 13. The metal foil is synonymous with metal foils 42 shown in FIGS. 14 to 20. It should be noted that as the resonator 1, a resonator of a bilaterally-supported type where the supporting portions 3 are provided on both sides in a lateral direction from the joining tool portion 4 is shown but a resonator of a unilaterally-supported type where a supporting portions are provided on one side in a lateral direction from the joining tool portion 4. However, as compared with the resonator 1 of the unilaterally-supported type, the resonator 1 of the bilaterally-supported type applies no unbalanced pressure to the object to be joined when pressure is applied to the object to be joined by the joining tool portion 4.

Returning to FIG. 1, a dimension of the joining tool portion 4 which protrudes from an outer face of the resonation main body portion 2 is set so as to have a maximum vibration amplitude point where the workpiece-side face 5 and the protrusion 11 or 21 are vibrated with a maximum amplitude in lateral directions shown by arrow 6. Though a length 7 of the resonation main body portion 2 from one end thereof in the lateral direction to the other end may have at least a length of a half wavelength of a resonation frequency of ultrasonic vibration or acoustic vibration transmitted from a vibrator 38 (see FIG. 13), a resonation main body portion 2 illustrated here has a length of one wavelength. Though the resonation main body portion 2 may be in a round bar shape, the resonation main body portion 2 illustrated here is in a square bar shape. The maximum vibration amplitude points are located at both end portions and a central portion along the length of the resonation main body portion 2.

At the position of the maximum vibration amplitude point at the central portion of the resonation main body portion 2 in the lengthwise direction, the joining tool portion 4 is provided so as to protrude downward from the outer face of the resonation main body portion 2. When a dimension of the joining tool portion 4 which protrudes from the outer face of the resonation main body portion 2 is reduced, the joining tool portion 4 may be provided so as to protrude from the outer face of the resonation main body portion 2 in at least one direction of an upward direction, a forward direction, and rearward direction.

The supporting portions 3 are provided at positions of minimum vibration amplitude points between the central portion and both the end portions along the length of the resonation main body portion 2 so as to protrude outward the outer face of the resonation main body portion 2. The minimum vibration amplitude point is also called "nodal point". An embodiment of the supporting portion 3 protruding outward from the outer face of the resonation main body portion 2 will be clarified by referring to Paragraph [0013] and FIG. 2 of the publication of Japanese Patent No. 4564548.

When the resonation main body portion 2 is in a round bar shape, the supporting portion 3 may surround the resonation main body portion 2 in a circumferential direction of the resonation main body portion 2. An embodiment of the supporting portion 3 surrounding the resonation main body portion 2 in the circumferential direction will be clarified by referring to FIG. 5 or FIG. 18 of the publication of Japanese Patent No. 2911394.

The resonation main body portion 2 may have a structure where the central portion having the joining tool portion 4 and both the end portions having the supporting portions 3 are coaxially connected by a coupling such as a headless screw or a threaded rod, though such a structure is complicated.

The central portion having the joining tool portion 4 of the resonation main body portion 2 is expressed as horn, while both the end portions having the supporting portions 3 of the resonation main body portion 2 are expressed as booster.

The joining tool portion 4 may have a structure integrated with the resonation main body portion 2 or a structure separated from the resonation main body portion 2 and connected to the resonation main body portion 2 by a coupling such as a headless screw or a threaded rod. When the structure where the joining tool portion 4 is connected to the resonation main body portion 2 is adopted, the joining tool portion 4 may be connected to the resonation main body portion 2 by joining agent such as brazing material without using the coupling such as the headless screw or the threaded rod. Such a shape as a round bar shape or a square bar shape is applicable to a whole shape of the joining tool portion 4.

Figure 2A:
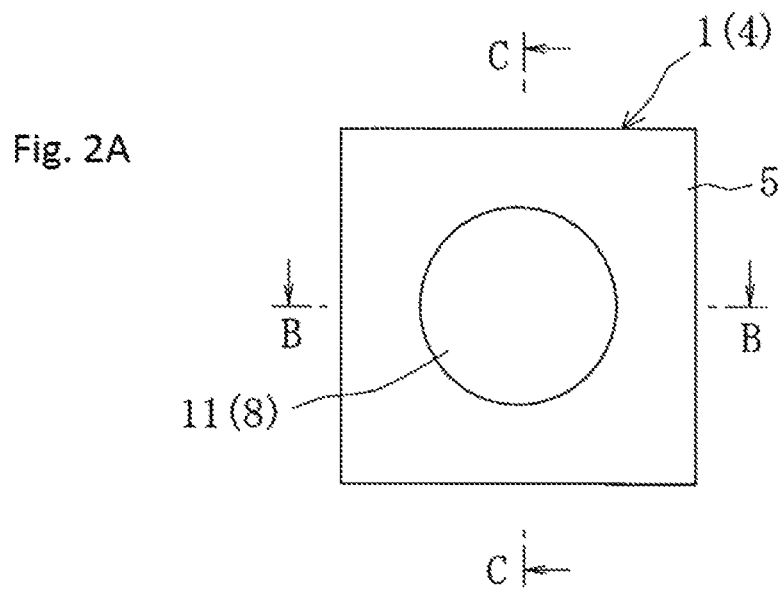
FIGS. 2A to 2C show a semispherical protrusion of the resonator for joining according to an embodiment for carrying out the present invention, FIG. 2A being a bottom view, FIG. 2B being a sectional view taken along line B-B of FIG. 2A, and FIG. 2C being a sectional view taken along line C-C of FIG. 2A.
Figure 2B:
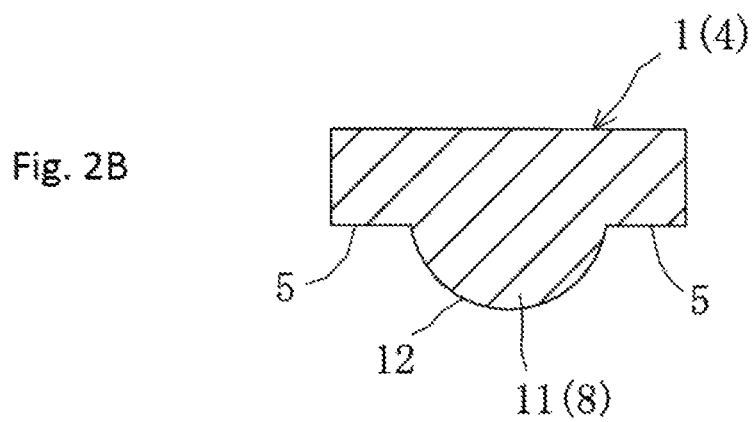
Figure 2C:
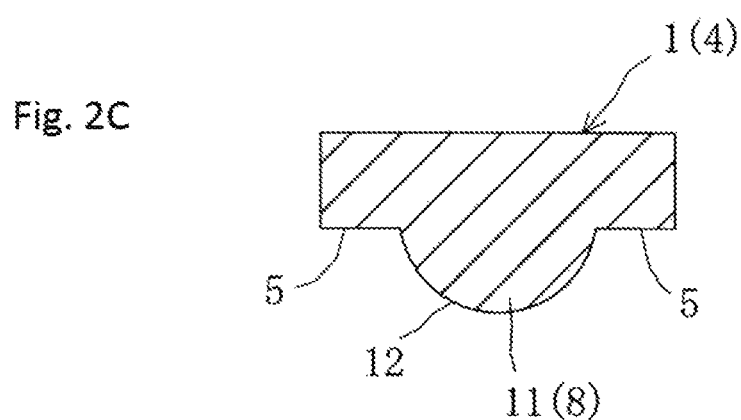

With reference to FIGS. 2A to 2C, the semispherical protrusion 11 constituted as the distal end portion 8 of the resonator 1 according to an embodiment for carrying out the invention will be described. As shown in FIG. 2A, the shape of the protrusion 11 as viewed from the bottom of the protrusion 11 is not limited to a circular shape but it may be an elliptical shape. As shown in FIGS. 2B and 2C, the outer face of the protrusion 11 is constituted as a convex arc-shaped face portion 12. The convex arc-shaped face portion 12 draws a smooth convex circular arc from the resonator 1 side toward a central portion of the outer face of the protrusion 11 and reaches to the workpiece-side face 5 so as to circle the protrusion in a horizontal plane parallel to the workpiece-side face 5, centering on a central line extending in a vertical direction of the outer face of the protrusion 11. That is, the outer face of the protrusion 11 is composed of the convex arc-shaped face portion 12 to constitute a convex circular arc surface which does not include an angular shape edge and which protrudes outward from the resonator 1 side. A position of the central portion of the convex arc-shaped face portion 12 drawing a convex arc-shaped face in a vertical direction may be the same position as the workpiece-side face 5 or a position different from that of the workpiece-side face 5. As shown in FIGS. 2B and 2C, the root portion of the protrusion 11 on the resonator 1 side has a structure where the outer face of the protrusion 11 constituting the convex arc-shaped face portion 12 reaches to the workpiece-side face 5.

Figure 3A:
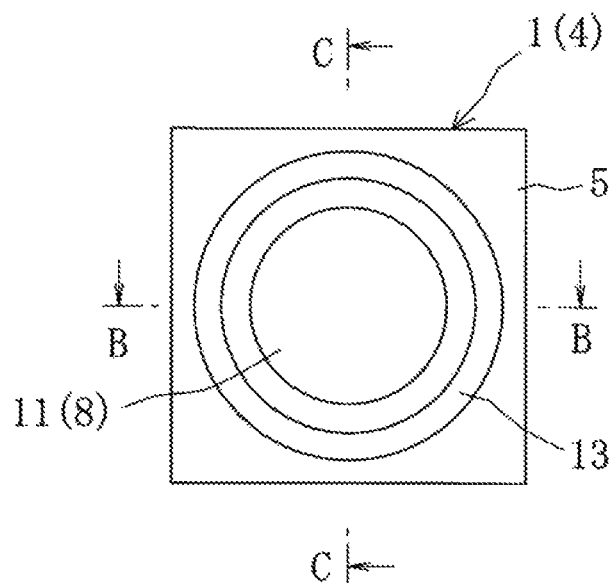
FIGS. 3A to 3C show the semispherical protrusion of the resonator for joining and a surrounding protrusion according to an embodiment for carrying out the present invention, FIG. 3A being a bottom view, FIG. 3B being a sectional view taken along line B-B of FIG. 3A, and FIG. 3C being a sectional view taken along line C-C of FIG. 3A.
Figure 3B:
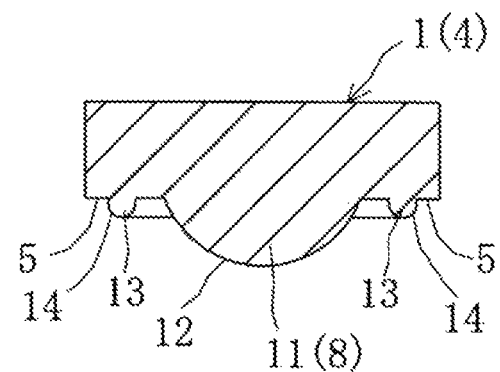
Figure 3C:
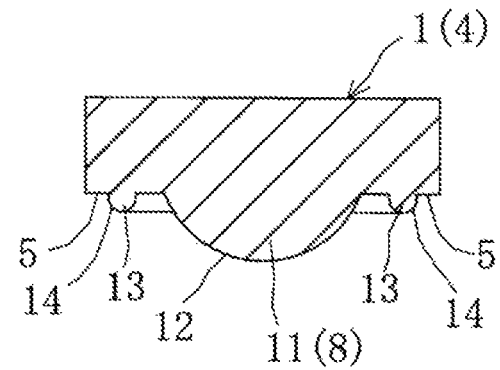

With reference to FIGS. 3A to 3C, a surrounding protrusion 13 around the semispherical protrusion 11 constituted as the distal end portion 8 of the resonator 1 according to an embodiment for carrying out the invention will be described. As an embodiment for carrying out the invention shown in FIGS. 3A to 3C, a structure where the convex arc-shaped face portion 12 of the protrusion 11 and a convex arc-shaped face portion 14 of the surrounding protrusion 13 reaches to the workpiece-side face 5 is illustrated.

As shown in FIG. 3A, the surrounding protrusion 13 is provided on the resonator 1 around the semispherical protrusion 11 and apart from the protrusion 11. As shown in FIGS. 3B and 3C, an outer face of the surrounding protrusion 13 is constituted as the convex arc-shaped face portion 14. The convex arc-shaped face portion 14 draws a smooth convex circular arc from the resonator 1 side toward a central portion of the outer face of the surrounding protrusion 13 and reaches to the workpiece-side face 5 so as to circle the surrounding protrusion 13 in a horizontal plane perpendicular to the workpiece-side face 5, centering on a central line extending in a vertical direction of the outer face of the surrounding protrusion 13. That is, the outer face of the surrounding protrusion 13 is composed of the convex arc-shaped face portion 14 to constitute a convex circular arc face which does not include an angular shape edge and which protrudes outward from the resonator 1 side. The surrounding protrusion 13 is not limited to one annular protrusion arranged annularly around one protrusion 11, but may be a plurality of annular protrusions arranged annularly around one protrusion. The position of a central portion of the convex arc-shaped face portion 14 drawing the convex arc-shaped face in a vertical direction may be the same position as the workpiece-side face 5 or a position different from that of the workpiece-side face 5. A dimension of the surrounding protrusion 13 protruding downward from the workpiece-side face 5 is made smaller than a dimension of the protrusion 11 protruding downward from the workpiece-side face 5.

Figure 4A:
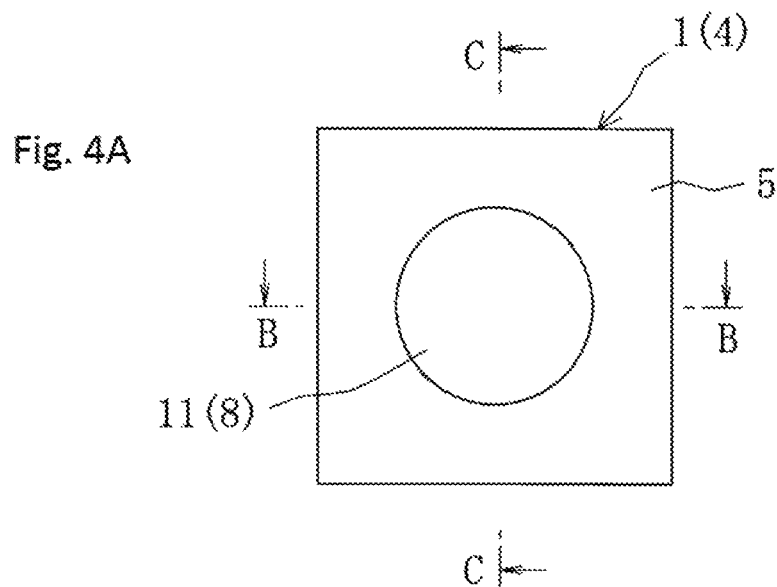
FIGS. 4A to 4C show a structure of the semispherical protrusion different from that shown in FIGS. 2A to 2C according to an embodiment for carrying out the present invention, FIG. 4A being a bottom view, FIG. 4B being a sectional view taken along line B-B of FIG. 4A, and FIG. 4C being a sectional view taken along line C-C of FIG. 4A.
Figure 4B:
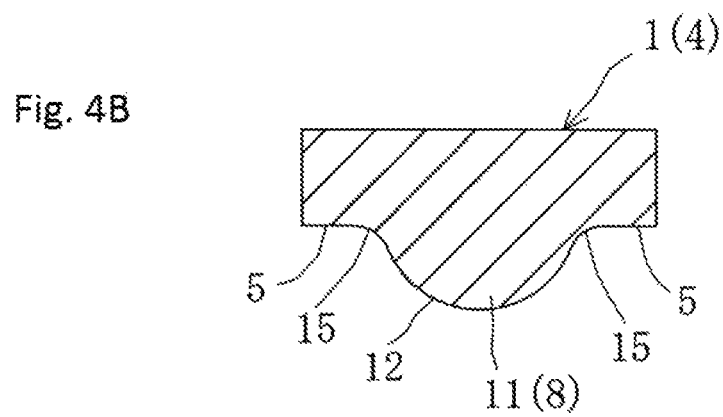
Figure 4C:
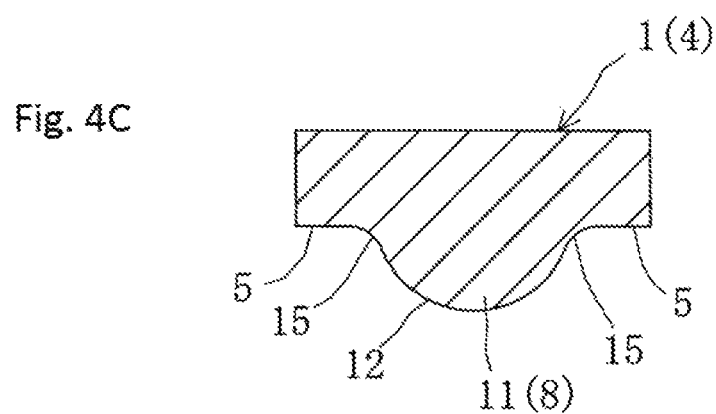

With reference to FIGS. 4A to 4C, a shape different from FIGS. 2A to 2C of a root portion on the resonator 1 side in the semispherical protrusion 11 constituted as the distal end portion 8 of the resonator 1 according to an embodiment for carrying out the invention will be described. As shown in FIGS. 4B and 4C, the root portion of the protrusion 11 is constituted as a concave arc-shaped face portion 15. The concave arc-shaped face portion 15 draws a smooth concave circular arc from the protrusion 11 side toward the workpiece-side face 5, and circumscribes the convex arc-shaped face portion 12 and the workpiece-side face 5. That is, the root portion of the protrusion 11 is composed of a concave arc-shaped face portion 15 to constitute a concave circular arc face recessed from the outside of the resonator 1 into the inside thereof, not including an angular shape edge. Thereby, any crack due to ultrasonic vibration or acoustic vibration during joining is not generated at the root portion of the protrusion 11.

Figure 5A:
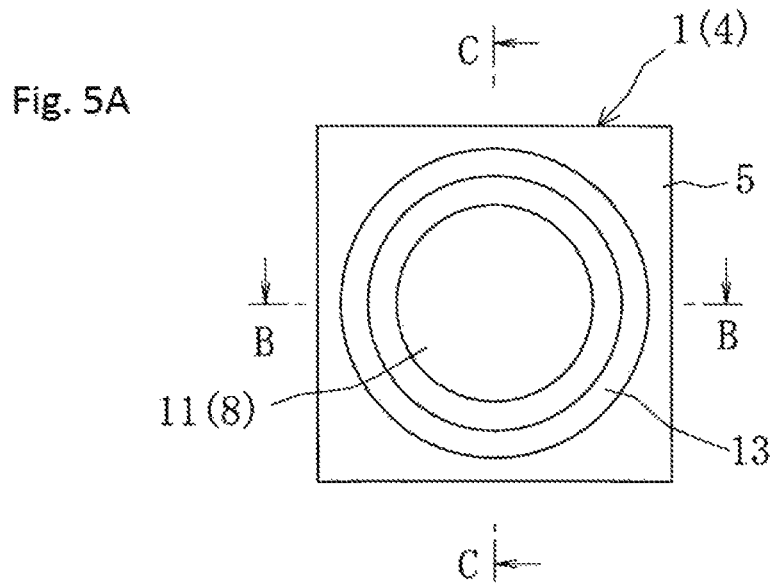
FIGS. 5A to 5C show a structure of the semispherical protrusion of the resonator for joining and a surrounding protrusion according to an embodiment for carrying out the present invention different from that shown in FIGS. 3A to 3C, FIG. 5A being a bottom view, FIG. 5B being a sectional view taken along line B-B of FIG. 5A, and FIG. 5C being a sectional view taken along line C-C of FIG. 5A.
Figure 5B:
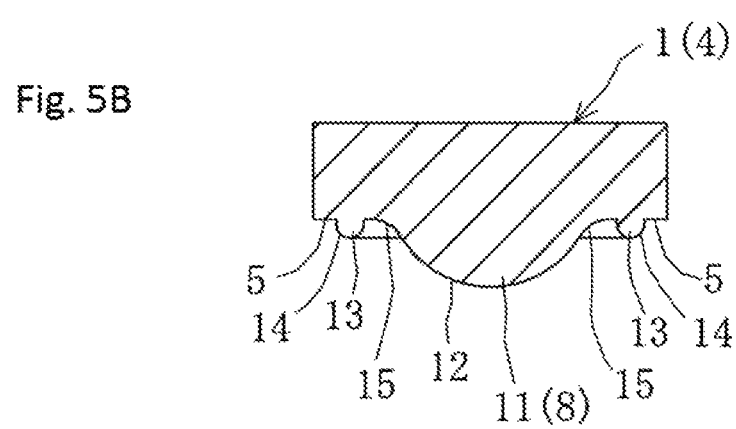
Figure 5C:
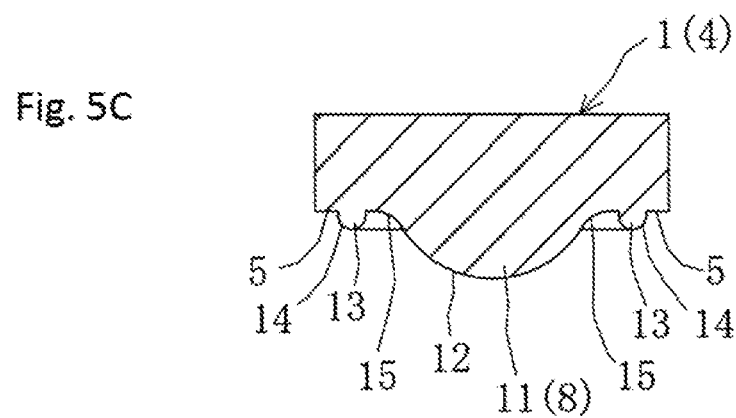

With reference to FIGS. 5A to 5C, a structure of the root portion of the semispherical protrusion 11 and the surrounding protrusion 13 on the resonator 1 side according to an embodiment for carrying out the invention, which is different from that shown in FIGS. 3A to 3C, will be described. The embodiment for carrying out the invention shown in FIGS. 5A to 5C has a structure where the convex arc-shaped face portion 14 reaches to the workpiece-side face 5 and the concave arc-shaped face portion 15 circumscribes the convex arc-shaped face portion 12 and the workpiece-side face 5.

Figure 6A:
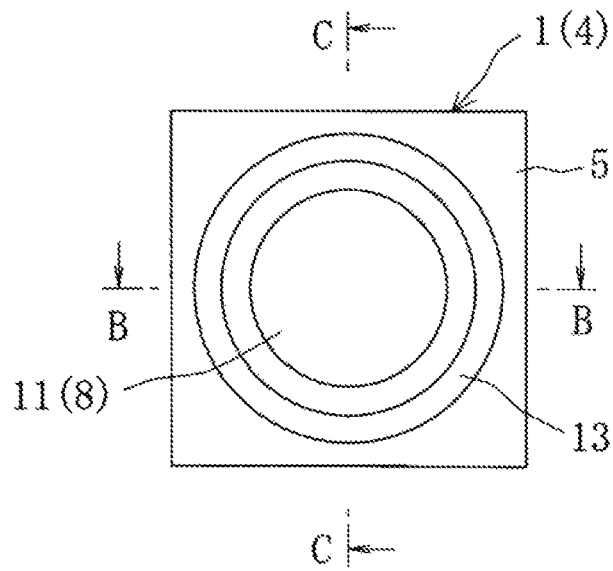
FIGS. 6A to 6C show a structure of the semispherical protrusion of the resonator for joining and a surrounding protrusion according to an embodiment for carrying out the invention different from that shown in FIGS. 5A to 5C, FIG. 6A being a bottom view, FIG. 6B being a sectional view taken along line B-B of FIG. 6A, and FIG. 6C being a sectional view taken along line C-C of FIG. 6A.
Figure 6B:
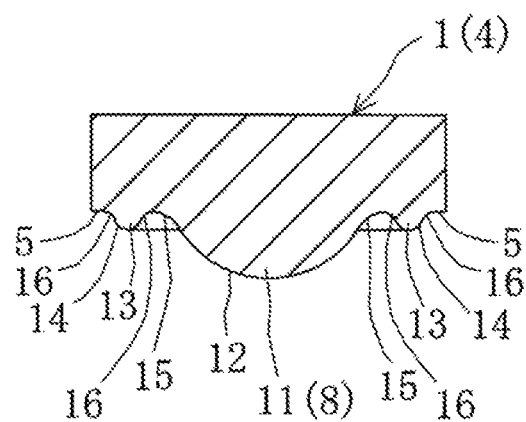
Figure 6C:
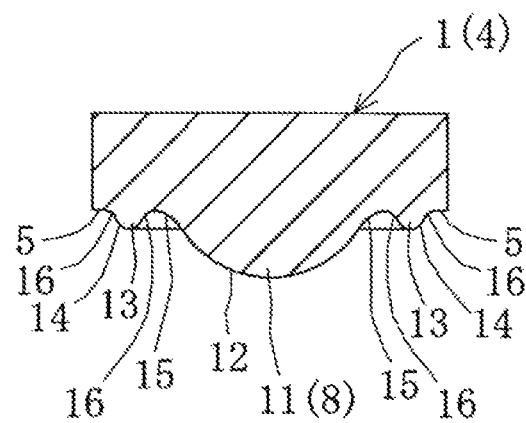

With reference to FIGS. 6A to 6C, a root portion on the resonator 1 side of the surrounding protrusion 13 provided on the resonator 1 according to an embodiment for carrying out the invention will be described. As shown in FIGS. 6B and 6C, the root portion of the surrounding protrusion 13 is constituted as a concave arc-shaped face portion 16. The concave arc-shaped face portion 16 draws a smooth concave circular arc from the surrounding protrusion 13 side toward the workpiece-side face 5, and circumscribes the convex arc-shaped face portion 14 and workpiece-side face 5 and circumscribes the convex arc-shaped face portion 14 and the concave arc-shaped face portion 15 or the workpiece-side face 5. That is, the root portion of the surrounding protrusion 13 is composed of a concave arc-shaped face portion 16 to constitute a concave circular arc face recessed from the outside of the resonator 1 into the resonator 1, and not including any angular sharp edge. Thereby any crack due to ultrasonic vibration or acoustic vibration during joining is not generated at the root portion of the surrounding protrusion 13.

Figure 7:
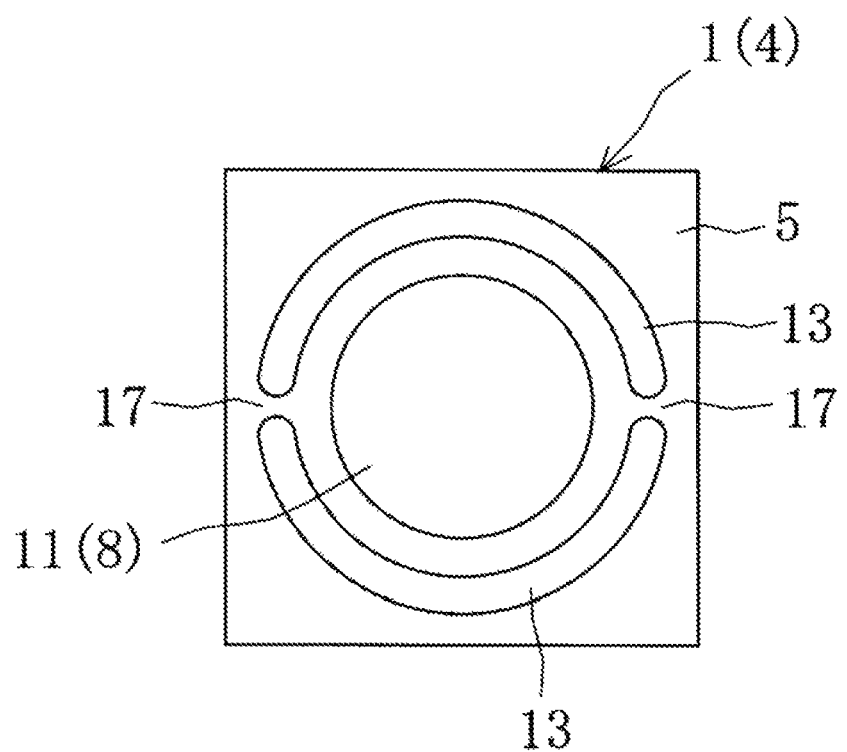
FIG. 7 is a bottom view of a surrounding protrusion divided around a semispherical protrusion according to an embodiment for carrying out the invention, as viewed from below.
Figure 10A:
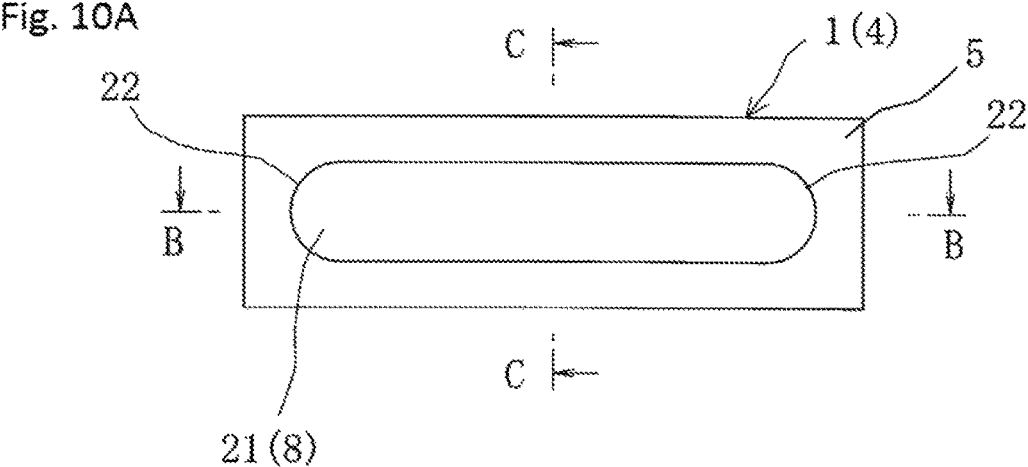
FIGS. 10A to 10C show a structure of the hog-backed protrusion of the resonator for joining according to an embodiment for carrying out the invention different from that shown in FIGS. 8A to 8C, FIG. 10A being a bottom view, FIG. 10B being a sectional view taken along line B-B of FIG. 10A, and FIG. 10C being a sectional view taken along line C-C of FIG. 10A.
Figure 10B:
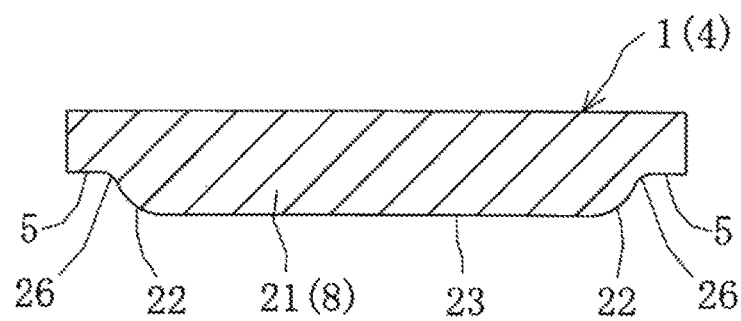
Figure 10C:
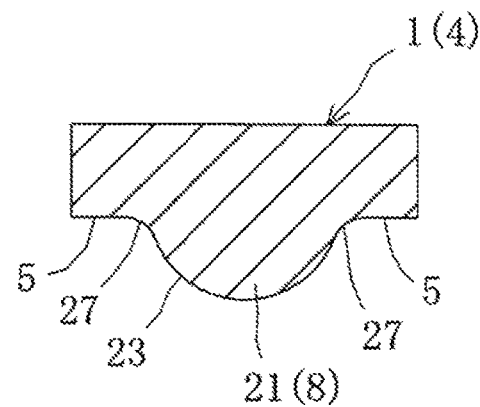

With reference to FIG. 7, the surrounding protrusion 13 provided on the resonator 1 according to an embodiment for carrying out the invention will be described. The surrounding protrusion 13 shown in FIGS. 3A to 3C, FIG. 5A and FIG. 6A is formed in an annular shape completely circling the protrusion 11, but a surrounding protrusion 13 shown in FIG. 7 is divided at a break(s) 17 provided at one position or a plurality of positions. An end portion of the surrounding protrusion 13 on the break 17 side is constituted as a convex arc-shaped face portion corresponding to a convex arc-shaped face portion 22 shown in FIGS. 8A and 8B. Further, the root portion on the resonator 1 side at the end portion on the break 17 of the surrounding protrusion 13 has a structure where the convex arc-shaped face portion corresponding to the convex arc-shaped face portion 22 shown in FIG. 8B reaches to the workpiece-side face 5 or it is constituted as a concave arc-shaped face portion corresponding to a concave arc-shaped face portion 26 as shown in FIGS. 10A to 10C.

Figure 8A:
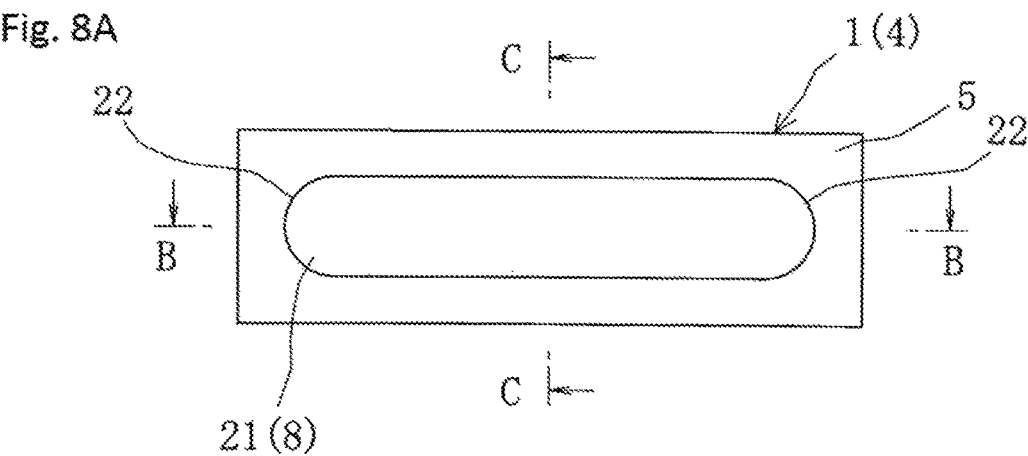
FIGS. 8A to 8C show a hog-backed protrusion of the resonator for joining according to an embodiment for carrying out the invention, FIG. 8A being a bottom view, FIG. 8B being a sectional view taken along line B-B of FIG. 8A, and FIG. 8C being a sectional view taken along line C-C of FIG. 8A.
Figure 8B:
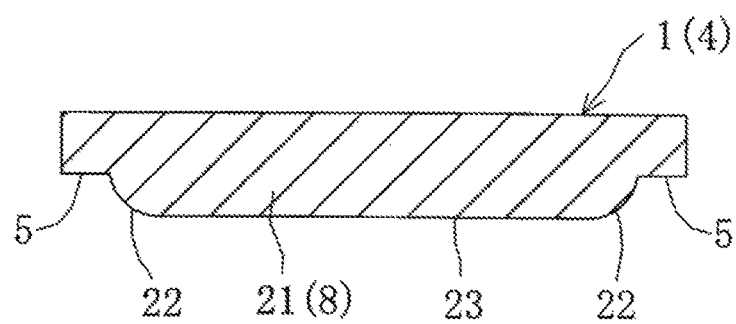
Figure 8C:
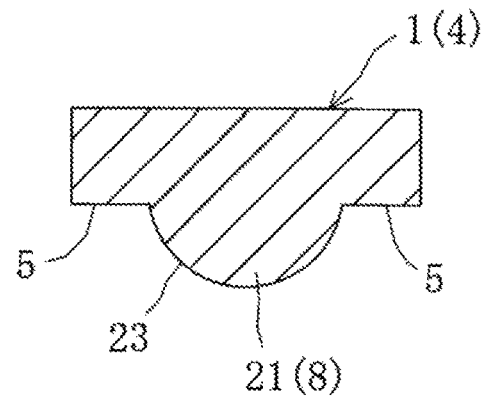

With reference to FIGS. 8A to 8C, a hog-backed protrusion 21 constituted as the distal end portion 8 of the resonator 1 according to an embodiment for carrying out the invention will be described. As shown in FIG. 8A, when the protrusion 21 is viewed from a bottom face thereof, outer faces at both longitudinal end portions of the protrusion 21 are constituted as convex arc-shaped face portions 22. The convex arc-shaped face portion 22 draws a smooth convex circular arc from a central line extending in a longitudinal direction of the outer face of the protrusion 21 toward both sides in a direction perpendicular to the central line extending in the longitudinal direction of the outer face of the protrusion 21, and circumscribes both transverse end portions of the protrusion 21, so as to make a semicircle around the protrusion 21 in a horizontal plane parallel to the workpiece-side face 5, centering on a central line extending in a longitudinal direction of the outer face of the protrusion 21. The protrusion 21 has a shape obtained by translating a plurality of semispherical protrusions 11 shown in FIG. 2A along one straight line and connecting them in one row. A shape of the protrusion 21 as viewed from below is not limited to an elliptical shape shown in FIG. 8A, but it may be an oval shape.

As show in FIG. 8B, the convex arc-shaped face portions 22 draws a smooth convex circular arc from the workpiece-side face 5 toward a central portion of the outer face of the protrusion 21, smoothly connects without a difference in level to the convex arc-shaped face portion 23 constituted as a transverse outer face of the protrusion 21 and reaches to the workpiece-side face 5, so as to make a quadrant around the protrusion 21 in a vertical plane perpendicular to the workpiece-side face 5, centering on a central line extending in a vertical direction of the outer face of the protrusion 21. That is, outer faces at both longitudinal end portions of the protrusion 21 are composed of the convex arc-shaped face portions 22 shown in FIG. 8B to constitute convex circular arc faces protruding outward from the side of the resonator 1 and not including any angular sharp edge. A position of a central point for depicting a convex circular face of the convex arc-shaped face portion 22 in a vertical direction may be the same position as the workpiece-side face 5 or may be a position different from the workpiece-side face 5.

As shown in FIG. 8C, a transverse outer face of the protrusion 21 is constituted as the convex arc-shaped face portion 23. The convex arc-shaped face portion 23 draws a smooth convex circular arc from the workpiece-side face 5 toward a central portion of the outer face of the protrusion 21, and reaches to the workpiece-side face 5, so as to make a semicircle around the protrusion 21 in a vertical plane perpendicular to the workpiece-side face 5, centering on a central line extending in a vertical direction of the outer face of the protrusion 21. That is, since the convex arc-shaped face portion 22 shown in FIG. 8B and the convex arc-shaped face portion 23 shown in FIG. 8C are smoothly connected to each other without a difference in level, the outer face of the protrusion 21 constitutes a convex circular arc face protruded outward from the resonator 1 side and not including any angular sharp edge.

Figure 9A:
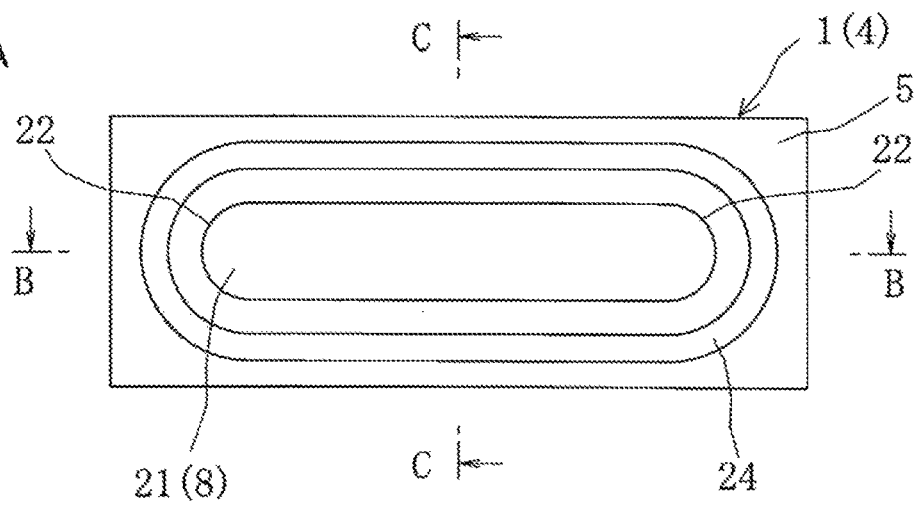
FIGS. 9A to 9C show the hog-backed protrusion of the resonator for joining and a surrounding protrusion according to an embodiment for carrying out the invention, FIG. 9A being a bottom view, FIG. 9B being a sectional view taken along line B-B of FIG. 9A, and FIG. 9C being a sectional view taken along line C-C of FIG. 9A.
Figure 9B:
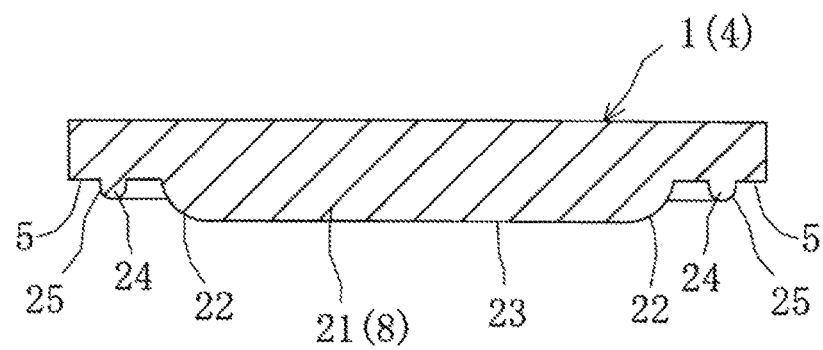
Figure 9C:
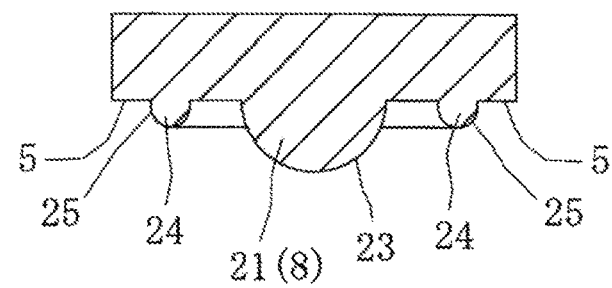

With reference to FIGS. 9A to 9C, a surrounding protrusion 24 surrounding the hog-backed protrusion 21 constituted as the distal end portion 8 of the resonator 1 according to an embodiment for carrying out the invention will be described. As the embodiment for carrying out the invention shown in FIGS. 9A to 9C, a structure where the convex arc-shaped face portions 22 and 23 of the protrusion 21 and a convex arc-shaped face portion 25 of the surrounding protrusion 24 reaches to the workpiece-side face 5 is illustrated.

As shown in FIG. 9A, the surrounding protrusion 24 is provided on the resonator 1 around the hog-backed protrusion 21 apart from the protrusion 21. As shown in FIGS. 9B and 9C, a dimension of the surrounding protrusion 24 protruding downward from the workpiece-side face 5 is made smaller than a dimension of the protrusion 21 protruding downward from the workpiece-side face 5. An outer face of the surrounding protrusion 24 is constituted as a convex arc-shaped face portion 25. The convex arc-shaped face portion 25 draws a smooth convex circular arc from the resonator 1 side toward a central portion of the outer face of the surrounding protrusion 24, and reaches to the workpiece-side face 5, so as to circle the surrounding protrusion 24 in a horizontal plane perpendicular to the workpiece-side face 5, centering on a central line extending in a vertical direction of the outer face of the surrounding protrusion 24. That is, the outer face of the surrounding protrusion 24 is composed of the convex arc-shaped face portion 25 to constitute a convex circular arc face protruding outward from the side of the resonator 1, and not including any angular sharp edge. The surrounding protrusions 24 is not limited to one surrounding protrusion 24 arranged annularly around one protrusion 21, but may be a plurality of surrounding protrusions 24 arranged annularly around one protrusion 21. A position of a central point for depicting a convex arc-shaped face on the convex arc-shaped face portion 25 in a vertical direction may be the same position as the workpiece-side face 5 or it may be different from a position of the workpiece-side face 5.

With reference to FIGS. 10A to 10C, a shape different from FIGS. 8A to 8C of a root portion on the resonator 1 side in the hog-backed protrusion 21 constituted as the distal end portion 8 of the resonator 1 according to an embodiment for carrying out the invention will be described. As shown in FIG. 10B, a longitudinal root portion of the protrusion 21 is constituted as a concave arc-shaped face portion 26. The concave arc-shaped face portion 26 draws a smooth concave circular arc from the protrusion 21 side toward the workpiece-side face 5, and circumscribes the convex arc-shaped face portion 22 and the workpiece-side face 5. That is, the root portion of the protrusion 21 is composed of the concave arc-shaped face portion 26 to constitute a concave circular arc face recessed from the outside of the resonator 1 toward the inside thereof, not including an angular shape edge.

As shown in FIG. 10C, s transverse root portion of the protrusion 21 is constituted as a concave arc-shaped face portion 27. The concave arc-shaped face portion 27 draws a smooth concave circular arc from the protrusion 21 side toward the workpiece-side face 5, and circumscribes the convex arc-shaped face portion 22 and the workpiece-side face 5. That is, the root portion of the protrusion 21 constitutes a convex circular arc face protruding outward from the side of the resonator 1, and not including any angular sharp edge, since the concave arc-shaped face portion 26 shown in FIG. 10B and a concave arc-shaped face portion 27 shown in FIG. 10C are smoothly connected to each other. Thereby, a crack due to ultrasonic vibration or acoustic vibration during joining is not generated at the root portion of the protrusion 21.

Figure 11A:
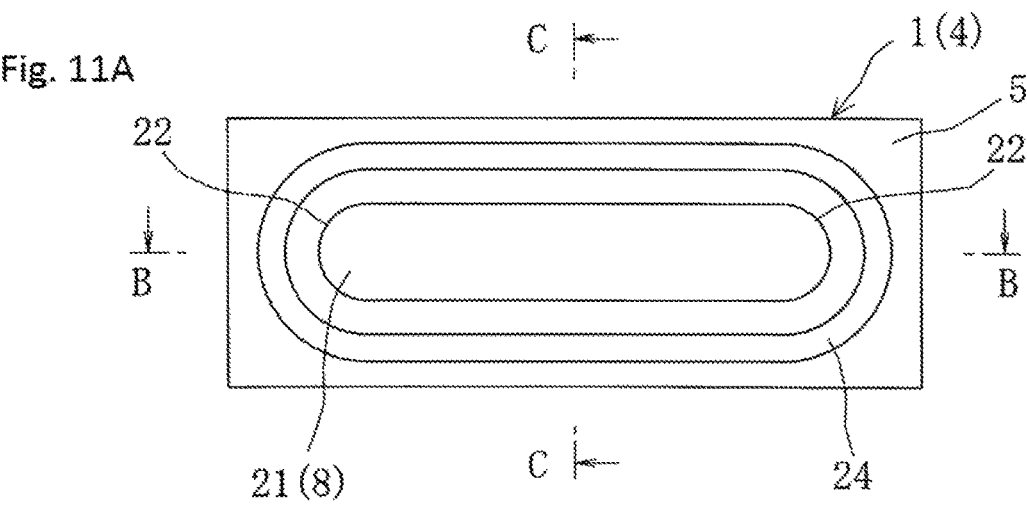
FIGS. 11A to 11C show a structure of the hog-backed protrusion of the resonator for joining and the surrounding protrusion according to an embodiment for carrying out the invention different from that shown in FIGS. 9A to 9C, FIG. 11A being a bottom view, FIG. 11B being a sectional view taken along line B-B of FIG. 11A, and FIG. 11C being a sectional view taken along line C-C of FIG. 11A.
Figure 11B:
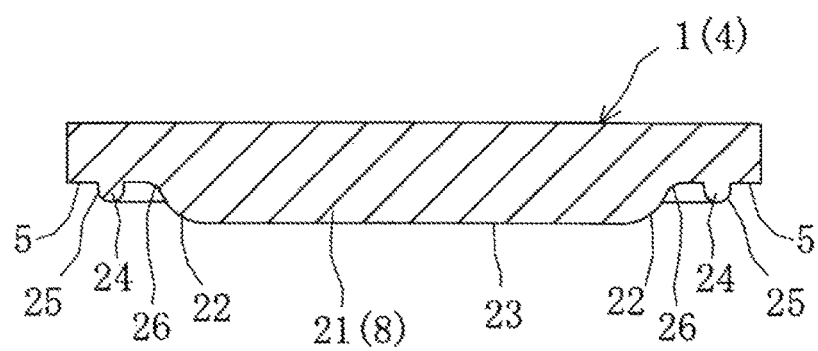
Figure 11C:
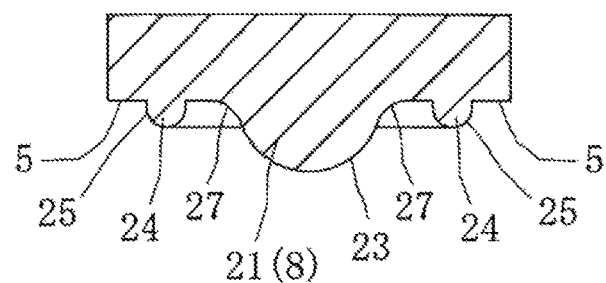

With reference to FIGS. 11A to 11C, a structure of a root portion on the resonator 1 side of the hog backed protrusion 21 and the surrounding protrusion 24 of the resonator 1 according to an embodiment for carrying out the invention, which is different from that shown in FIGS. 9A to 9C, will be described. As shown in FIG. 11B, the root portion has a structure where the convex arc-shaped face portion 25 reaches to the workpiece-side face 5, the concave arc-shaped face portion 26 circumscribes the convex arc-shaped face portion 23 and the workpiece-side face 5, and, as shown in FIG. 11C, the concave arc-shaped face portion 27 circumscribes the convex arc-shaped face portion 23 and the workpiece-side face 5.

Figure 12A:
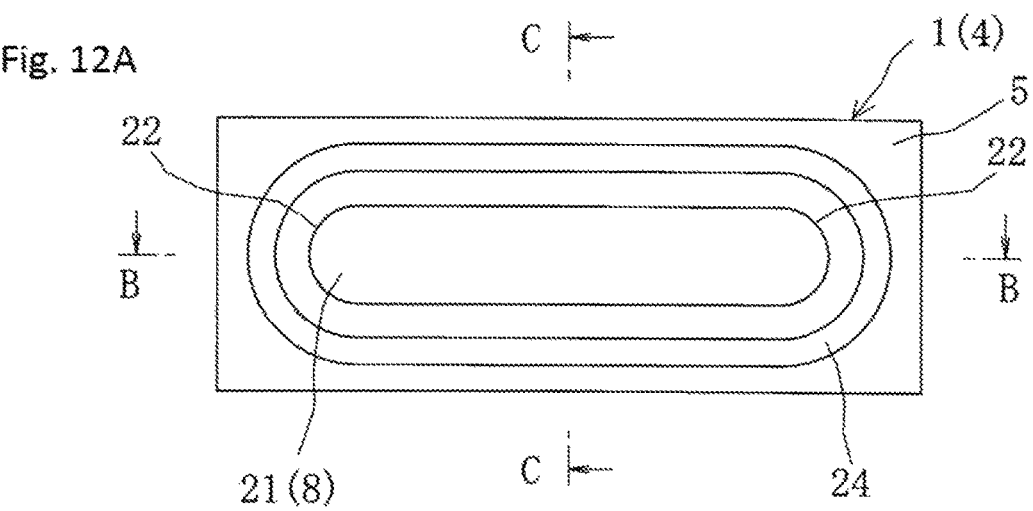
FIGS. 12A to 12C show a structure of the hog-backed protrusion of the resonator for joining and the surrounding protrusion according to an embodiment for carrying out the invention different from that shown in FIGS. 11A to 11C, FIG. 12A being a bottom view, FIG. 12B being a sectional view taken along line B-B of FIG. 12A, and FIG. 12C being a sectional view taken along line C-C of FIG. 12A.
Figure 12B:
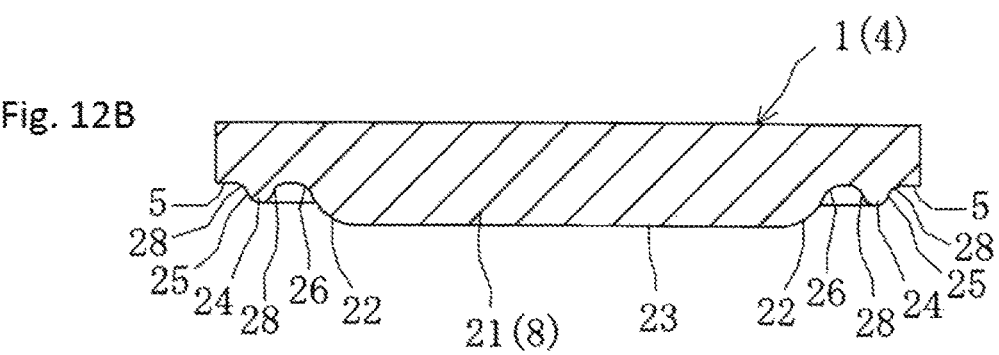
Figure 12C:
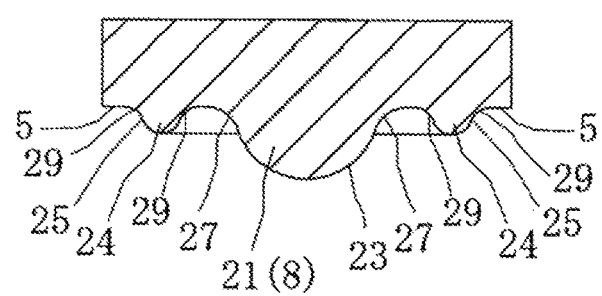

With reference to FIGS. 12A to 12C, a root portion on the side of the resonator 1 of the surrounding protrusion 24 provided on the resonator 1 according to an embodiment for carrying out the invention will be described. As shown in FIG. 12B, a longitudinal root portion of the surrounding protrusion 24 is constituted as a concave arc-shaped face portion 28. The concave arc-shaped face portion 28 draws a smooth concave circular arc from the surrounding protrusion 24 side toward the workpiece-side face 5 and circumscribes the convex arc-shaped face portion 25 and the workpiece-side face 5 and circumscribes the workpiece-side face 5 between the convex arc-shaped face portion 25 and the concave arc-shaped face portion 26 or between the protrusion 21 and the surrounding protrusion 24.

As shown in FIG. 12C, a transverse root portion of the surrounding protrusion 24 is constituted as a concave arc-shaped face portion 29. The concave arc-shaped face portion 29 draws a smooth concave circular arc from the surrounding protrusion 24 side to the workpiece-side face 5 and circumscribes the convex arc-shaped face portion 25 and the workpiece-side face 5 and circumscribes the workpiece-side face 5 between the convex arc-shaped face portion 25 and the concave arc-shaped face portion 27 or between the protrusion 21 and the surrounding protrusion 24. That is, the root portion of the surrounding protrusion 24 is composed of the concave arc-shaped face portion 28 shown in FIG. 12B and the concave arc-shaped face portion 29 shown in FIG. 12C to constitute a concave circular arc face recessed from the outside of the resonator 1 in the inside thereof, not including an angular sharp edge. Thereby, any crack due to ultrasonic vibration or acoustic vibration during joining is not generated at the root portion of the surrounding protrusion 24.

Though not shown, the structure of the surrounding protrusion 13 of FIG. 7 is similarly applicable to the surrounding protrusions 24 shown in FIGS. 9A to 9C, FIGS. 11A to 11C and FIGS. 12A to 12C by dividing the surrounding protrusions 24 of FIGS. 9A to 9C, FIGS. 11A to 11C and FIGS. 12A to 12C at the breaks 17 of FIG. 7.

Figure 13:
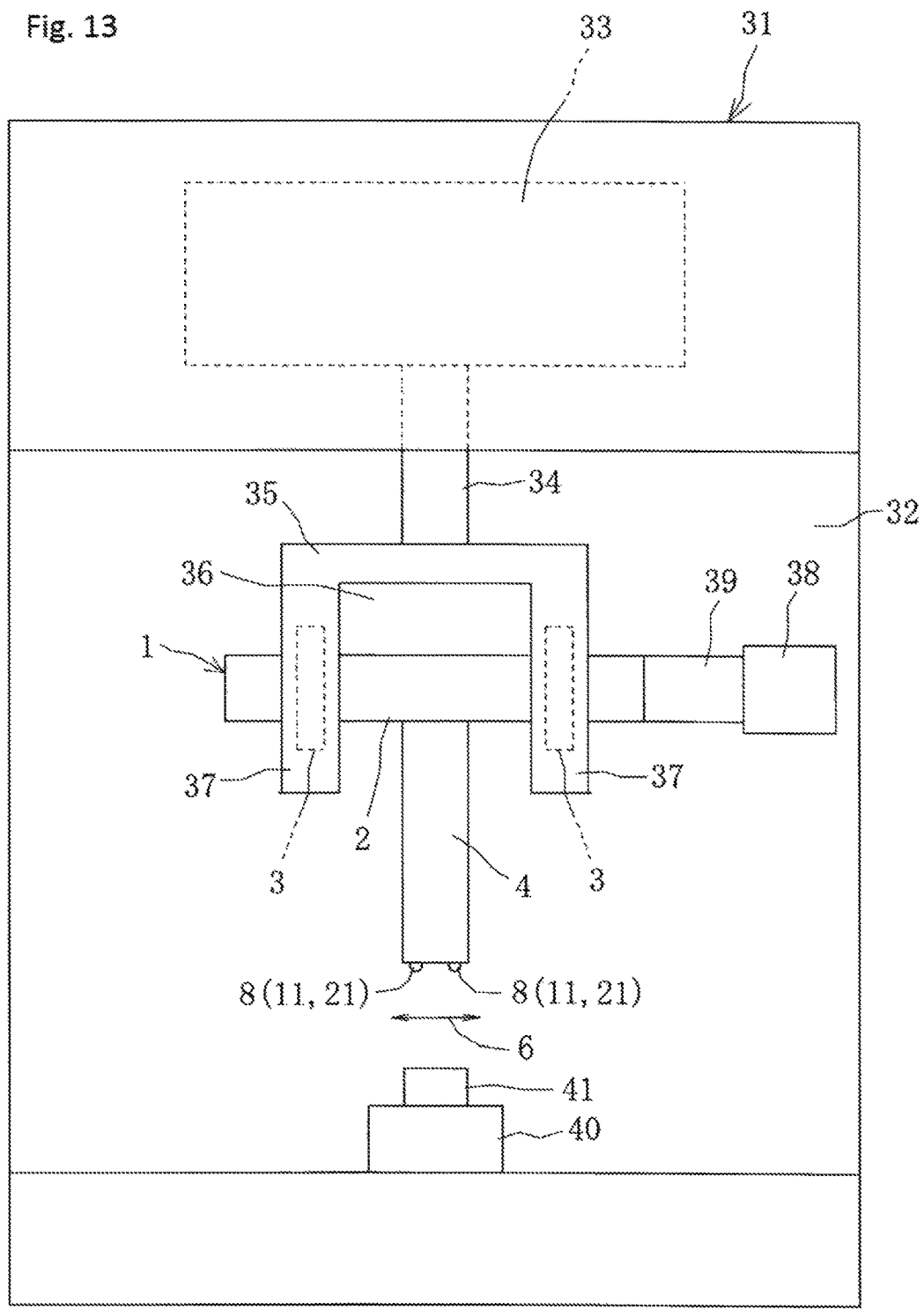
FIG. 13 is a front view showing a joining apparatus according to an embodiment for carrying out the invention.

With reference to FIG. 13, a joining apparatus 31 utilizing ultrasonic vibration or acoustic vibration according to an embodiment for carrying out the invention will be described. The joining apparatus 31 shown in FIG. 13 is provided with a pressure applying mechanism 33 at an upper portion of an apparatus frame body 32, and an output member 34 of the pressure applying mechanism 33 is provided with a holding tool 35. The holding tool 35 is provided with holding portions 37 at both lateral sides of the holding tool 35 corresponding to the right and left of a space portion 34 accessible from front, behind or below the resonator 1. In the holding tool 35, the resonator 1 is installed on the holding tool 35 such that a lengthwise direction of the resonator 1 is aligned with lateral directions shown by arrow 6, portions of the resonator 1 except for supporting portions 3 are arranged outside the space portion 36 and the holding tool 35 so as not to contact the holding tool 35, and the supporting portions 3 are supported by the holding portions 37. Thereby, the resonator 1 having the vibrator 38 at one end thereof is horizontally attached in a bilaterally-supported manner to the holding tool 35 which can move upward and downward.

An output end portion 39 of the vibrator 38 is coaxially coupled to one lateral end portion of the resonator 1 by a coupling such as a headless screw or a threaded rod, so that the resonator 1 resonates with acoustic vibration or ultrasonic vibration transmitted from the vibrator 38. A reception jig 40 serving as an anvil is provided at a lower portion of the apparatus frame body 32 so as to be located just below the joining tool portion 4.

When joining of an object to be joined 41 is performed by the joining apparatus 31 shown in FIG. 13, a space into which the object to be joined 41 can be inserted is formed between the distal end portion 8 of the resonator 1 and the reception jig 40, and the object to be joined 41 is placed on the reception jig 40 with the distal end portion 8 of the resonator 1 and reception jig 40 opposed to each other in the vertical direction. Next, the pressure applying mechanism 33 is driven to move the output member 34 downward, and accordingly the object to be joined 41 is clamped and pressed by the distal end portion 8 of the resonator 1 and the reception jig 40 from above and below, so that the resonator 1 resonates with acoustic vibration or ultrasonic vibration transmitted from the vibrator 38, the distal end portion 8 of the resonator 1 vibrates in lateral directions shown by arrow 6, regions to be joined of the object to be joined 41 are joined under pressure and vibration energy from the distal end portion 8. Thereafter, the pressure applying mechanism 33 is driven to move the output member 34 upward and accordingly the distal end portion 8 is separated from the object to be joined 41, so that the object to be joined 41 is left on the reception jig 40. The object to be joined 41 is removed from the reception jig 40, and one joining action on the object to be joined 41 is thus completed.

It could have been successfully confirmed that, as the object to be joined 41 used in the joining apparatus 31 shown in FIG. 13, a configuration of joining between resins where a plurality of synthetic resin members formed from thermoplastic synthetic resin are stacked, a configuration of joining between metals where a plurality of metal members of the same kind or different kinds are stacked, a configuration of joining between different materials where a resin pad(s) is(are) stacked on either top or bottom or both top and bottom of a plurality of metal members of the same kind or different kinds, a configuration of joining between different materials where a metal member and a ceramic member are stacked, a configuration of joining between different materials where a resin pad is stacked on either top or bottom or both top and bottom of a metal member and a ceramic member arranged in a stack, a configuration of joining between different materials where a metal member and a synthetic resin member are stacked, a configuration of joining between different materials where a resin pad is stacked on either top or bottom or both top and bottom of a metal member and a synthetic resin member arranged in a stack, or the like can be used.

In particular, even when a plurality of metal foils formed from aluminum, copper or the like are arranged in a stack as the object to be joined 41, the metal foil(s) is(are) not broken during joining by the distal end portion 8, since the distal end portion 8 of the resonator 1 for pressing down the metal foils is provided as the semispherical protrusion 11 shown in FIGS. 2A to 2C, the hog-backed protrusion 21 shown in FIGS. 7A to 7C, or a mixture of the semispherical protrusion 11 shown in FIGS. 2A to 2C and the hog-backed protrusion 21 shown in FIGS. 7A to 7C. 60 copper foils having a thickness of 10 μm as metal foils were stacked and joined by the joining apparatus 3 shown in FIG. 13, or when 60 aluminum foils having a thickness of 20 μm as metal foils were stacked and joined by the joining apparatus 31 shown in FIG. 13, it was successfully confirmed that breaking of the copper foil(s) and the aluminum foil(s) did not occur.

An intermediate booster (not shown) may be laterally, coaxially and integrally connected between a central portion having joining tool portion 4 and both end portions each having the supporting portion 3 of the resonator 1, between the resonator 1 and the joining tool portion 4, or between the resonator 1 and the output end portion 39 of the vibrator 38 by a coupling composed of a headless screw or a threaded rod. The intermediate booster is to adjust the amplitude of the resonator 1. By changing the magnitude (the shape) of the intermediate booster, the amplitude of the resonator 1 can be made large or small. When the intermediate booster is not used, the amplitude of the resonator 1 is the same as that of the vibrator 38, namely 1 time as large. However, a 1× magnification intermediate booster may be used.

As the joining apparatus 31, a joining apparatus disclosed in Japanese Patent No. 2911395 where a resonator is arranged in a vertical position is applicable.

Though not shown, the distal end portion of the reception jig 40 for pressing down the object to be joined 41 may be the protrusion 11 or 12 shown in FIGS. 2A to 12C, or may include the protrusions 11 and 21 in a mixed fashion, or may be provided with the surrounding protrusion 13 or 24. It should be noted that, joining of the object to be joined 41 may be performed with the reception jig 40 in an upper portion of the apparatus frame body 32 and with the resonator 1 and the holding tool 35 in a lower portion of the apparatus frame body 32, such that in FIG. 13 the holding tool 35 is detached from the output member 34, the reception jig 40 is detached from the apparatus frame body 32, the holding tool 35 detached is installed in the lower portion of the apparatus frame body 32 with the distal end potion 8 directed upward, and the reception jig 40 detached is mounted on the output member 34 with the distal end portion of the reception jig 40 directed downward.

With reference to FIGS. 14 to 20, several embodiments of joining of a foil stack 43 composed of a plurality of metal foils 42 arranged in a stack will be described.

Figure 14:
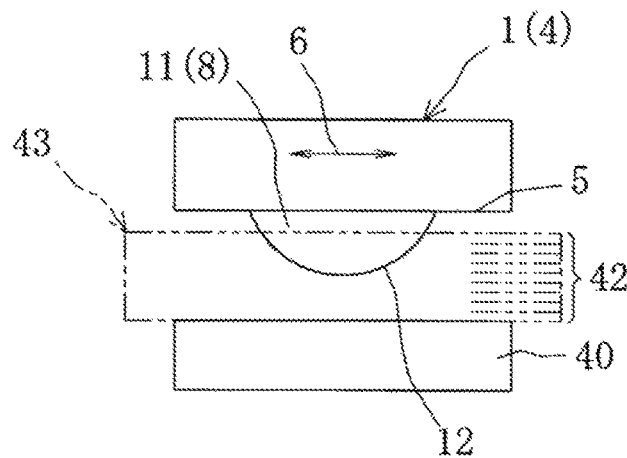
FIG. 14 is a schematic diagram showing an embodiment of joining to a foil stack according to an embodiment for carrying out the invention.

In FIG. 14, the resonator 1 provided with the protrusion 11 and the convex arc-shaped face portion 12 shown in FIGS. 2A to 2C is illustrated, where the position of the protrusion 11 that has completed joining of the foil stack 43 is shallow, and the protrusion 11 and the convex arc-shaped face portion 12 do not forcibly hold down the metal foils 42, but smoothly discharges an amount of metal corresponding to the volume of extension along the curved surface of the convex arc-shaped face portion 12 while laterally thinly stretching the metal foils 42 with lateral vibration indicated by arrow 6 from the resonator 1, that is, while causing the atoms of the metal foils 42 to move laterally, so that breaking of the metal foil(s) 42 is prevented. Thus, since the atoms of the metal foils 42 smoothly move, ingot joining or diffusion joining of the plurality of metal foils 42 arranged in a stack is achieved.

Figure 15:
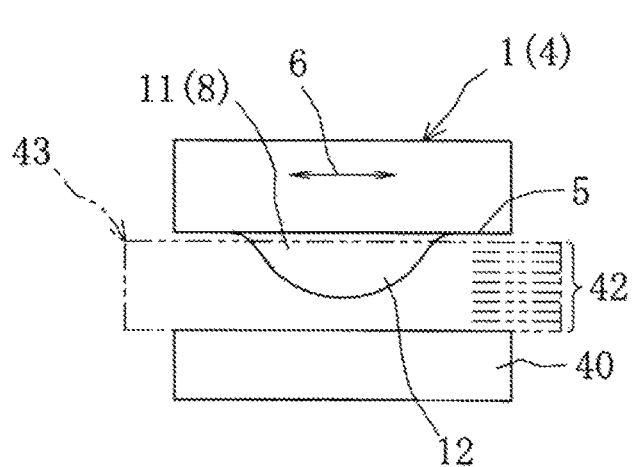
FIG. 15 is a schematic diagram showing an embodiment of joining to the foil stack according to an embodiment for carrying out the invention.

In FIG. 15, the resonator 1 provided with the protrusion 11, the convex arc-shaped face portion 12 and the concave arc-shaped face portion 15 shown in FIGS. 4A to 4C are illustrated, where the position of the protrusion 11 that has completed joining of the foil stack 43 is deeper than that shown in FIG. 14, and the protrusion 11, the convex arc-shaped face portion 12 and the concave arc-shaped face portion 15 are forced deeply into the metal foils 42 without breaking the metal foil(s) 42, thereby causing ingot joining or diffusion joining of the metal foils 42, while the concave arc-shaped face portion 15 is forcing down the metal foils 42, so that a beautiful finish of the joining reflecting the shape of the concave arc-shaped face portion 15 can be provided.

Figure 16:
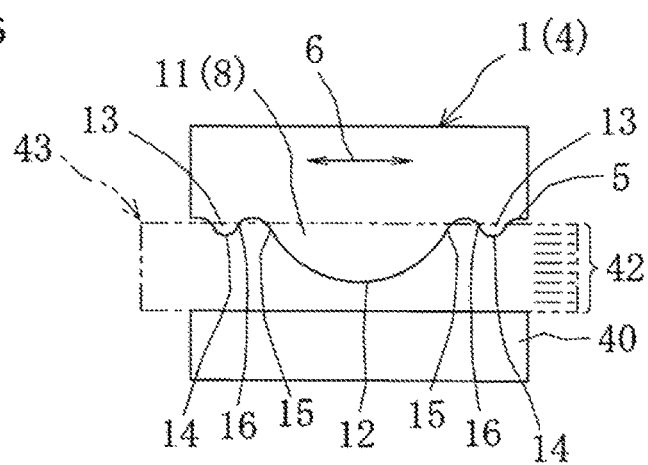
FIG. 16 is a schematic diagram showing an embodiment of joining to the foil stack according to an embodiment for carrying out the invention.

In FIG. 16, the resonator 1 provided with the protrusion 11, the convex arc-shaped face portion 12, the surrounding protrusion 13, the convex arc-shaped face portion 14, and the concave arc-shaped face portions 15 and 16 shown in FIGS. 6A to 6C is illustrated, where the position of the protrusion 11 that has completed joining of the foil stack 43 is deeper than that shown in FIG. 15, the protrusion 11, the convex arc-shaped face portion 12, the surrounding protrusion 13, the convex arc-shaped face portion 14, and the concave arc-shaped face portions 15 and 16 are deeply forced into the metal foils 42 without breaking the metal foil(s) 42, thereby causing ingot joining or diffusion joining of the metal foils 42, while the concave arc-shaped face portions 15 and 16 are pressing the metal foils 42, so that a beautiful finish of the joining reflecting the shapes of the concave arc-shaped face portions 15 and 16 can be provided. That is, the metal foils 42 can be held down and joined without breaking the metal foil(s) 42 in cooperation with the protrusion 11 and the surrounding protrusion 13.

Figure 17:
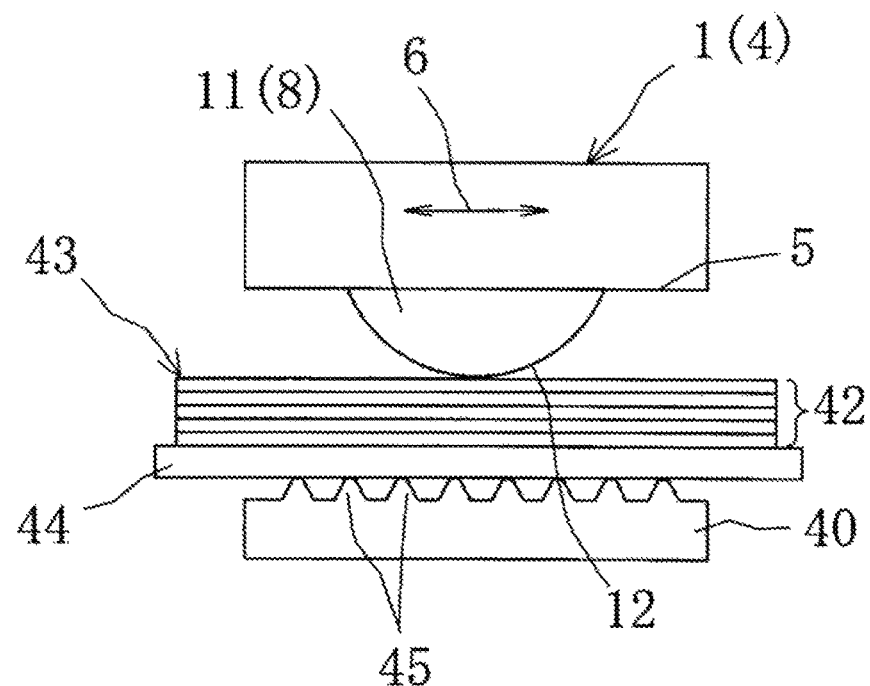
FIG. 17 is a schematic diagram showing an embodiment of joining to the foil stack according to an embodiment for carrying out the invention.

In FIG. 17, the resonator 1 provided with the protrusion 11 and the convex arc-shaped face portion 12 shown in FIGS. 2A to 2C, a protection member 44 composed of a metal sheet, and the reception jig 40 provided with a distal end portions 45 composed of a pyramidal or truncated pyramidal protrusion are illustrated, where the protection member 44 is placed on the distal end portions 45, the foil stack 43 is placed on the protection member 44, the foil stack 43 and the protection member 44 are clamped from above and below by the protrusion 11 and the distal end portions 45, pressure is applied to the foil stack 43 and the protection member 44 and ultrasonic vibration or acoustic vibration is applied thereto by the resonator 1, so that the metal foils 42 and the protection member 44 are joined to each other by ultrasonic vibration or acoustic vibration without the convex arc-shaped face portion 12 and the distal end portion 45 breaking the protection member 44 and the metal foils 42. When the protection member 44 is made from synthetic resin sheet, the metal foils 42 and the protection member 44 are not joined to each other.

In FIG. 17, the resonator 1 provided with the protrusion 11 and the convex arc-shaped face portion 12 shown in FIGS. 2A to 2C, one foil stack 43, the protection member 44 made of a metal sheet, and the reception jig 40 provided with the distal end portions 45 composed of pyramidal or truncated pyramidal protrusions are illustrated, where the foil stack 43 and the protection member 44 stacked with the foil stack 43 are clamped from above and below by the protrusion 11 and the distal end portion 45, and pressure and ultrasonic vibration or acoustic vibration are applied to the foil stack 43 and the protection member 44 by the resonator 1, so that metal foil 42 and the protection member 44 are joined to each other by ultrasonic vibration or acoustic vibration without the convex arc-shaped face portion 12 and the distal end portion 45 breaking the metal foils 42 and the protection member 44. When the protection member 44 is composed of a synthetic resin sheet, the metal foils 42 and the protection member 44 are not joined to each other.

Figure 18:
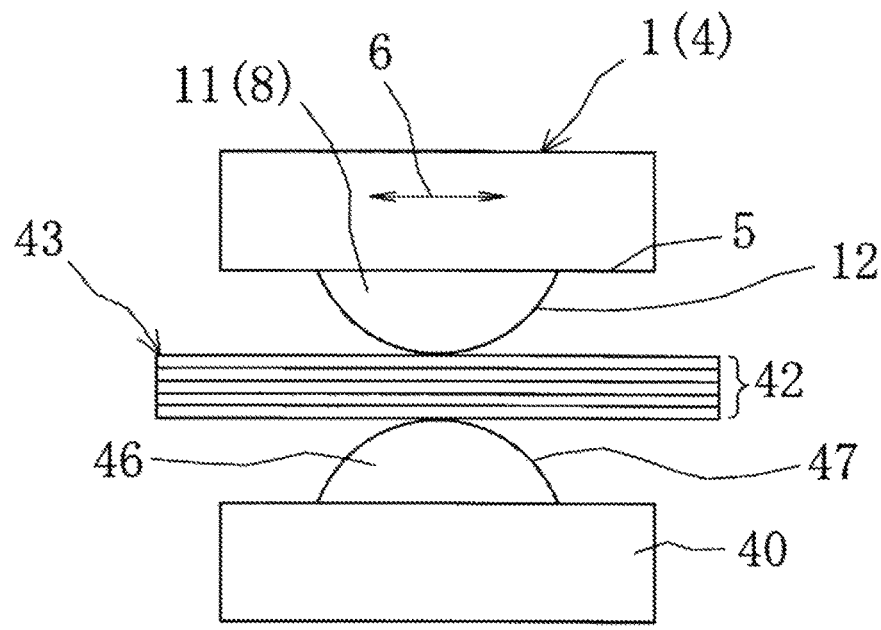
FIG. 18 is a schematic diagram showing an embodiment of joining of the foil stack according to an embodiment for carrying out the invention.

In FIG. 18, the resonator 1 provided with the protrusion 11 and the convex arc-shaped face portion 12 shown in FIGS. 2A to 2C, one foil stack 43, and the reception jig 40 provided with a protrusion 46 corresponding to the protrusion 11 shown in FIGS. 2A to 2C and a convex arc-shaped face portion 47 corresponding to the convex arc-shaped face portion 12 shown in FIGS. 2A to 2C are illustrated, where the foil stack 43 is clamped from above and below by the protrusions 11 and 46, and pressure and ultrasonic vibration or acoustic vibration are applied to the foil stack 43 by the resonator 1, so that the metal foils 42 are joined to each other by ultrasonic vibration or acoustic vibration without the convex arc-shaped face portions 12 and 47 breaking the metal foil(s) 42.

Figure 19:
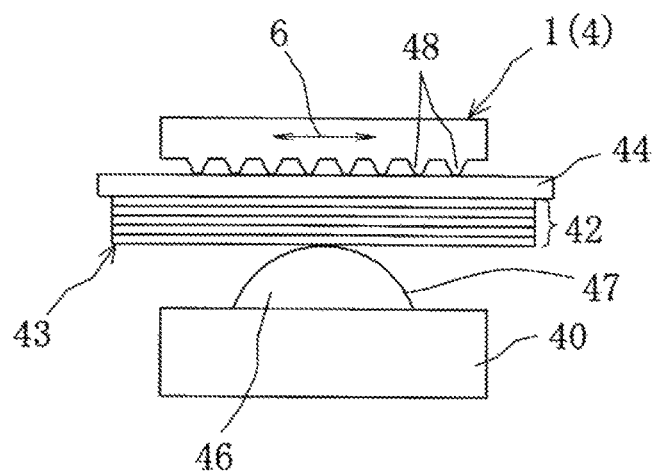
FIG. 19 is a schematic diagram showing an embodiment of joining to the foil stack according to an embodiment for carrying out the invention.

In FIG. 19, the resonator 1 provided with distal end portions 48 composed of pyramidal or truncated pyramidal protrusions, one foil stack 43, the protection member 44 composed of a metal sheet, and the reception jig 40 provided with the protrusion 46 and the convex arc-shaped face portion 47 are illustrated, where the foil stack 43 and the protection member 44 stacked on the foil stack 43 are clamped from above and below by the protrusion 46 and the distal end portion 48, and pressure and ultrasonic vibration or acoustic vibration are applied to the foil stack 43 and the protection member 44 by the resonator 1, so that the metal foils 42 and the protection member 44 are joined to each other by ultrasonic vibration or acoustic vibration without the convex arc-shaped face portion 47 and the distal end portion 48 breaking the metal foil(s) 42 and the protection member 44. When the protection member 44 is composed of a synthetic resin sheet, the metal foils 42 and the protection member 44 are not joined to each other.

Figure 20:
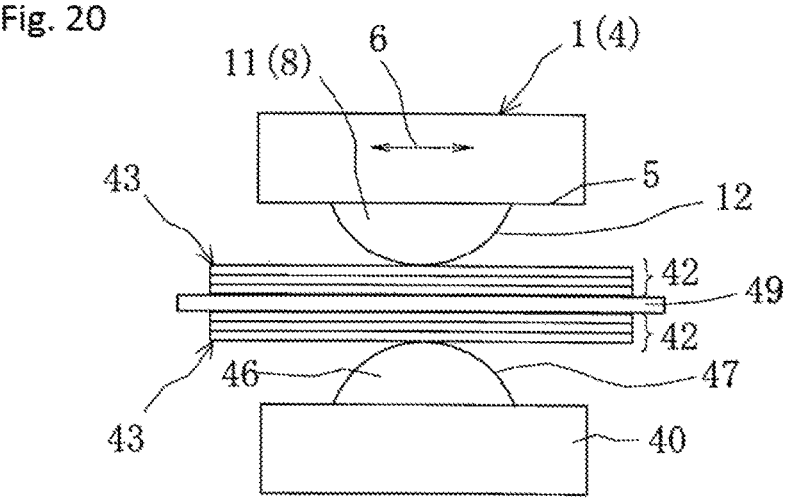
FIG. 20 is a schematic diagram showing an embodiment of joining to the foil stack according to an embodiment for carrying out the invention.
Figure 20:
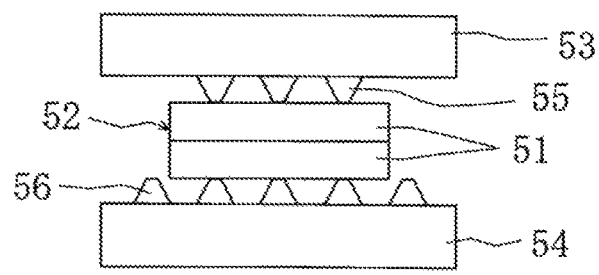
Figure 20:
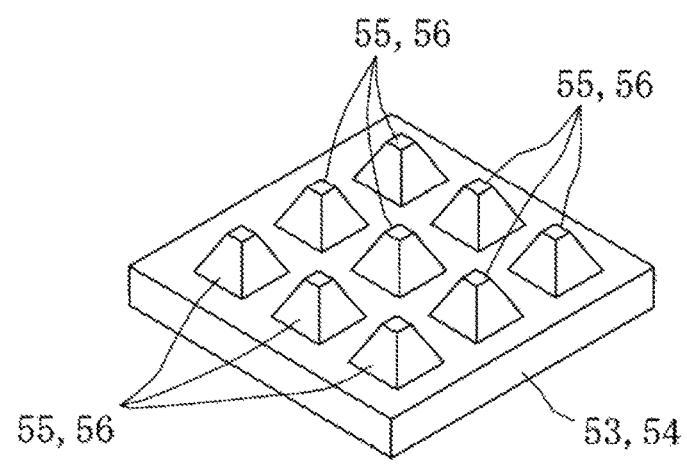

In FIG. 20, the resonator 1 provided with the protrusion 11 and the convex arc-shaped face portion 12 shown in FIGS. 2A to 2C, the reception jig 40 provided with the protrusion 46 and the convex arc-shaped face portion 47, two foil stacks 43, and the metal member 49 are illustrated, where two foil stacks 43 sandwiching the sheet-like metal member 49 therebetween are clamped from above and below by the protrusions 11 and 46, and pressure and ultrasonic vibration or acoustic vibration are applied to the foil stacks 43 and the protection member 44 by the resonator 1, so that the metal foils 42 and the metal member 49 are joined to each other by ultrasonic vibration or acoustic vibration without the two foil stacks 43 being broken by the convex arc-shaped face portions 12 and 47.

What is claimed is:

1. A resonator or a reception jig configured to perform joining of an object to be joined by utilizing ultrasonic vibration or acoustic vibration, wherein a distal end portion of the resonator configured to press down the object to be joined or a distal end portion of the reception jig configured to press down the object to be joined is constituted as a semispherical protrusion having an outer face not including an angular sharp edge;

wherein the resonator or the reception jig further comprises a surrounding protrusion concentrically surrounding the protrusion.

2. The resonator or the reception jig according to claim 1, wherein a root portion adjoining the resonator or the reception jig with the surrounding protrusion is constituted as a concave arc-shaped face portion which forms a smooth concave circular arc from the surrounding protrusion to the resonator or the reception jig.

3. The resonator or the reception jig according to claim 1, wherein at least one break is formed in the surrounding protrusion.

4. The resonator or the reception jig according to claim 1, wherein the root portion adjoining the resonator or the reception jig with the protrusion includes a smooth surface without including an angular sharp edge.

5. The resonator or the reception jig according to claim 1, wherein a root portion adjoining the resonator or the reception jig with the protrusion is constituted as a concave arc-shaped face portion which forms a smooth concave circular arc from the protrusion to the resonator or the reception jig.

6. The resonator or the reception jig according to claim 1, wherein the distal end portion of the resonator configured to press down the object to be joined is constituted as a first semispherical protrusion having an outer face not including an angular sharp edge, and wherein the distal end portion of the reception jig configured to press down the object to be joined is constituted as a second semispherical protrusion having an outer face not including an angular sharp edge.

* * * * *